United States Patent [19]

Hucul et al.

[11] Patent Number: 4,768,821
[45] Date of Patent: Sep. 6, 1988

[54] GRIPPER APPARATUS

[75] Inventors: Daniel E. Hucul, Bloomfield Hills; Ronald R. Matheson, Utica, both of Mich.

[73] Assignee: Auto/Con Corporation, Mt. Clemens, Mich.

[21] Appl. No.: 7,732

[22] Filed: Jan. 28, 1987

[51] Int. Cl.[4] .......................... B25J 15/08; B25J 19/02
[52] U.S. Cl. .................................. 294/119.1; 294/88; 294/907; 901/37; 901/46
[58] Field of Search .................... 294/67.33, 86.4, 88, 294/103.1, 116, 119.1, 907; 269/32, 34, 229, 230, 233, 235; 279/110, 114; 414/741, 751; 901/31-34, 36-39, 46

[56] References Cited

U.S. PATENT DOCUMENTS

| | | | |
|---|---|---|---|
| 1,435,035 | 11/1922 | Walroden | 269/233 X |
| 2,590,509 | 3/1952 | Church | 294/119.1 X |
| 3,370,213 | 2/1968 | Rose | 901/34 X |
| 4,529,237 | 7/1985 | Gupta et al. | 294/86.4 |
| 4,566,727 | 1/1986 | Yuda | 294/88 |
| 4,577,898 | 3/1986 | Nusbaumer et al. | 294/88 |
| 4,579,380 | 4/1986 | Zaremsky et al. | 294/119.1 |
| 4,607,873 | 8/1986 | Nusbaumer et al. | 294/88 |
| 4,611,846 | 9/1986 | Feiber et al. | 294/119.1 X |
| 4,627,654 | 12/1986 | Van Oost | 294/106 |

FOREIGN PATENT DOCUMENTS

| | | | |
|---|---|---|---|
| 3410601 | 9/1985 | Fed. Rep. of Germany | 294/119.1 |
| 18165 | 2/1978 | Japan | 294/119.1 |
| 138271 | 10/1979 | Japan | 294/119.1 |
| 417272 | 7/1974 | U.S.S.R. | 901/37 |
| 804421 | 2/1981 | U.S.S.R. | 294/119.1 |

OTHER PUBLICATIONS

UVT Universal, Heavy Duty Rotary Shift Locks, 4 pages.
1825 Series, 2½-inch Bore, 1 page.
A Few Important Parts, 1 page.
phd, inc., Gripers Catalog 922C, 16 pages.
Robohand, Inc., brochure, 24 pages.

*Primary Examiner*—Johnny D. Cherry
*Attorney, Agent, or Firm*—Harness, Dickey & Pierce

[57] ABSTRACT

A gripper apparatus for use in robotic operations is disclosed. The gripper apparatus includes a body, a yoke member supported by the body member for linear reciprocation, finger members supported by the yoke members for a linear reciprocating stroke for grasping and releasing a workpiece. A cam mechanism is associated with the yoke members to drive the yoke members in a reciprocating linear stroke. A rotary actuator is associated with the cam mechanism for rotatably driving the cam mechanism, which, in turn, transmits rotary movement of the rotary actuator into reciprocating linear movement of the yoke members to drive the finger members to grasp or release a workpiece. Also disclosed is a lock mechanism for locking the cam mechanism against any undesired reverse rotation which, in turn, locks the finger members of the gripper apparatus along the stroke of the finger members.

14 Claims, 3 Drawing Sheets

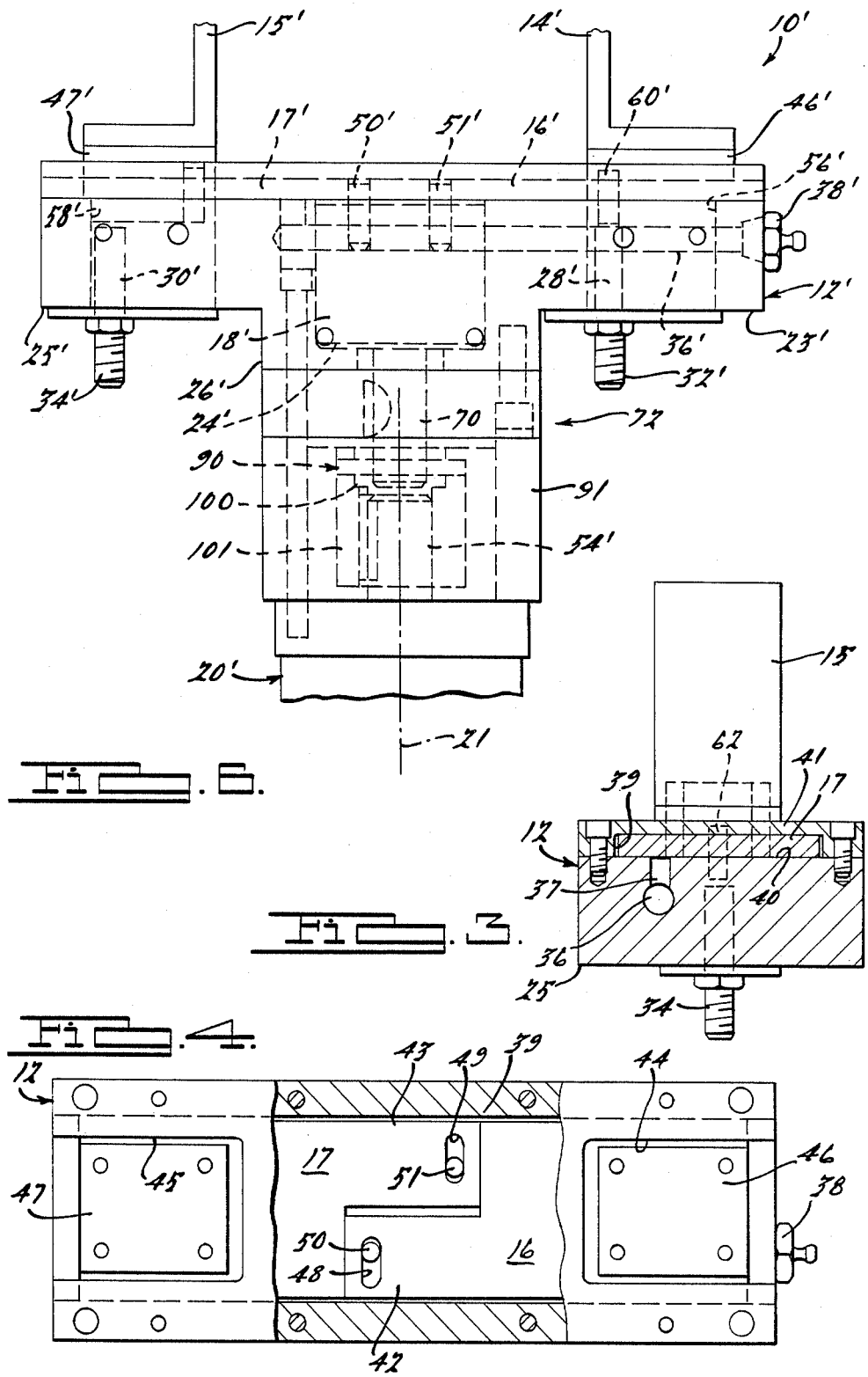

GRIPPER APPARATUS

BACKGROUND AND SUMMARY OF THE INVENTION

The present invention relates to robotic apparatus and, more particularly, to gripper apparatus having fingers that are driven by rotary actuators.

Gripper apparatus are used in the robotic field for moving workpieces, or the like, from one position to another. Also, gripper fingers may be used to perform different operations on a workpiece. Generally, the fingers of the gripper apparatus are pneumatically or hydraulically activated for grasping and releasing workpieces.

The current art is shown by U.S. Pat. Nos. 4,577,898 and 4,607,873, both issued to Nusbaumer, et al. The fingers of these apparatus are activated by reciprocating piston actuators. A disadvantage of this type of apparatus is that the up and down reciprocating movement of the piston must be translated into side to side lateral movement of the fingers. This translation of movement is accomplished by a linkage bar device which must be precisely set in order for the fingers to move through their proper stroke. Also, the working surface of the piston is limited to the diameter of the piston cylinder. Further, these types of apparatus do not have a means for locking the fingers in position if a power failure occurs. Thus, if a pneumatic or hydraulic hose breaks on the apparatus and the workpiece is in an elevated position, the workpiece will be released with significant potential negative effects.

The present invention overcomes the disadvantages of the above art by providing the art with a gripper apparatus having a rotary actuator. The present invention enables the gripper apparatus to lock during movement of the gripper fingers if power to the actuator is lost. The present invention also enables sensing of the gripper fingers while they move fron one position to another.

The present invention provides the art with a new and improved gripper apparatus. The gripper apparatus of the present invention includes a body, fingers for grasping and releasing a workpiece are supported by the body, a pair of yoke members supported by the body for providing the fingers with straight line movement, and a cam mechanism associated with the yoke members for driving each of the yoke members in a reciprocating linear motion. A rotary actuator is associated with the cam mechanism to rotatably drive the cam mechanism which, in turn, translates the rotary movement of the rotary actuator into reciprocating linear movement of the yoke members to drive the fingers away from and towards one another along a linear path.

The present invention may also include a lock mechanism associated with the cam mechanism and rotary actuator. The lock mechanism enables the fingers to be locked at any position along the reciprocating linear stroke of the fingers. This lock mechanism enables a workpiece to be locked in position if power to the actuator is lost.

The present invention also may include proximity switches mounted on the body. The proximity switches sense the reciprocating linear movement of each yoke member. The proximity switches may communicate with a microprocessor for enabling control of the gripper apparatus to perform different functions.

From the subsequent description and the appended claims taken in conjunction with the accompanying drawings, other objects and advantages of the present invention will become apparent to one skilled in the art.

BRIEF DESCRIPTION OF THE DRAWINGS

FIG. 3 is a cross-section view of FIG. 1 along Line 3—3 thereof.

FIG. 4 is a partial breakaway view of FIG. 2.

FIG. 6 is a side elevational view of an alternative embodiment of a gripper apparatus in accordance with the present invention.

DETAILED DESCRIPTION OF THE PREFERRED EMBODIMENT

Figure 1:
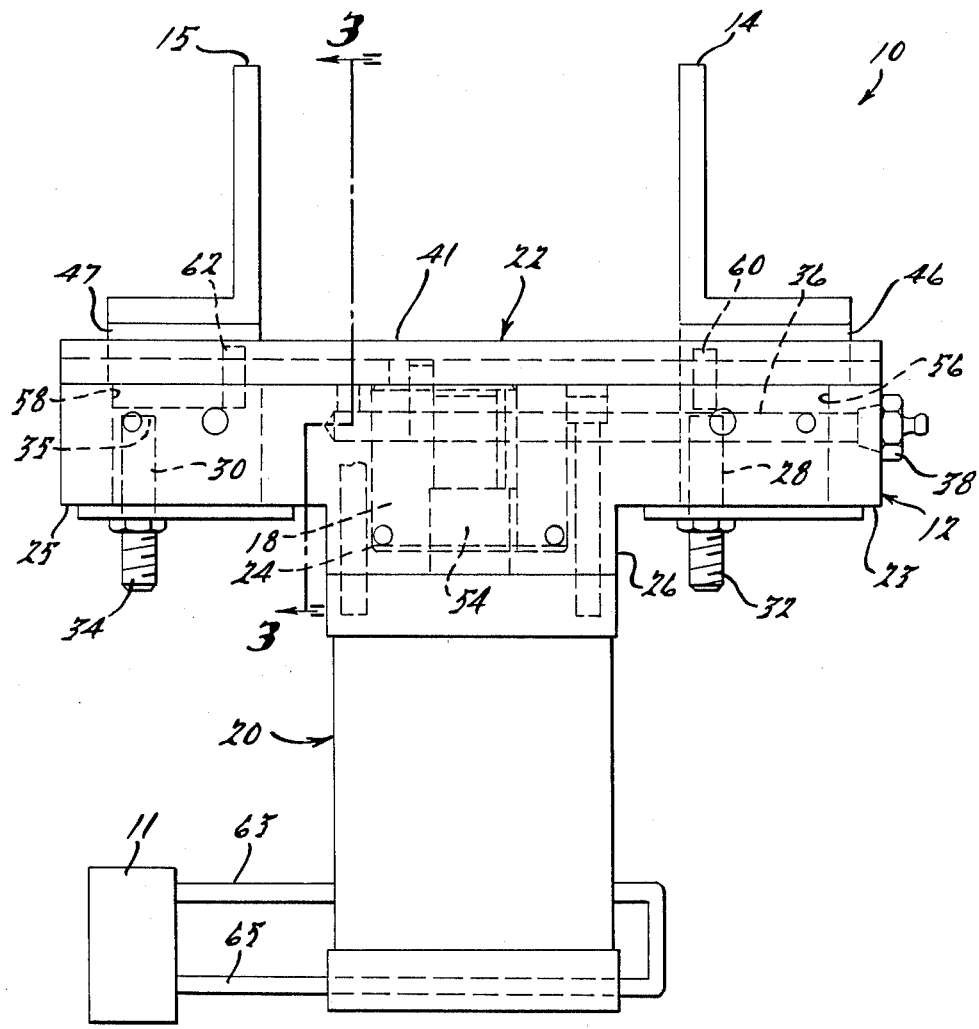
FIG. 1 is a side elevational view of a gripper apparatus in accordance with the present invention.

Referring to the drawings, particularly FIG. 1, a gripper apparatus is shown and is designated with reference numeral 10. The gripper apparatus 10 includes a body 12 for providing the gripper apparatus with a means for attaching the gripper apparatus to a robotic assembly by conventional means. The body 12 has a pair of fingers 14 and 15 projecting from the body 12. The fingers 14 and 15 are secured to a pair of yoke members 16 and 17 which are supported by the body 12. The yoke members 16 and 17 provide the fingers 14 and 15 with reciprocating linear movement. A cam mechanism 18 is supported by the body 12 and is in communication with the yoke members 16 and 17. The cam mechanism 18 is rotatably coupled with a rotary actuator 20. The rotary actuator 20 drives the cam mechanism 18 with rotary movement. The cam mechanism 18 translates the rotary movement from the rotary actuator 20 to reciprocating linear movement of the yoke members 16 and 17 on the body 12.

The body 12 of the gripper apparatus 10 has an overall T-shape. The horizontal cross portion 22 of the "T" is divided into two sections 23 and 25 by the vertical portion 26 of the "T". A channel 39 is disposed in the cross portion 22 of the body. The channel 39 is defined by a planar surface 40 and an exterior surface 41 as seen in FIG. 3. The vertical portion 26 of the "T" includes a cavity 24 for housing the cam mechanism 18. The cavity 24 communicates with the channel 39. The sections 23 and 25 of the cross portion 22 each have apertures 28 and 30 for enabling proximity switches 32 and 34 to be positioned on the body 12. The proximity switches 32 and 34 sense disposition of the yoke members 16 and 17 in the cross portion 22.

The body 12 has a bore 36 disposed transversely in the body 12. A grease fitting 38 is positioned in the free end of the bore 36 to lubricate the yoke members 16 and 17 sliding along the body 12. The bore 36 has an auxiliary bore 37 communicating with the planar surface 40 in the body 12 to lubricate the planar surface 40.

The yoke members 16 and 17 slide on a planar surface 40 in the channel 39. Each of the yoke members 16 and 17 has a generally rectangular shape with a projecting portion 42 or 43, respectively. Finger supports 46 and 47 are positioned on the yoke members 16 and 17 and project through cut outs 44 and 45 in an exterior wall 41 of the body 12. The finger supports 46 and 47 enable securement of the fingers 14 and 15 onto the yoke members 16 and 17.

The yoke members 16 and 17 have elongated slots 48 and 49, respectively, located in the projecting portions 42 and 43, respectively, for enabling pins 50 and 51, to communicate with the respective yoke member 16 or 17, see FIG. 4. The slots 48 and 49 enable the pins 50 and 51 to move within the slots 48 and 49 as the cam mechanism 18 travels through its stroke. As the cam mechanism 18 travels through its stroke, the pins 50 and 51 drive the yoke members 16 and 17 back and forth along a linear path on the planar surface 40 of the body 12. The linear movement of the yoke members 16 and 17 moves the fingers 14 and 15, which oppose one another, in a stroke of approximately a distance of one inch. This stroke enables the opposing fingers members 14 and 15 to grasp and release workpieces.

Figure 2:
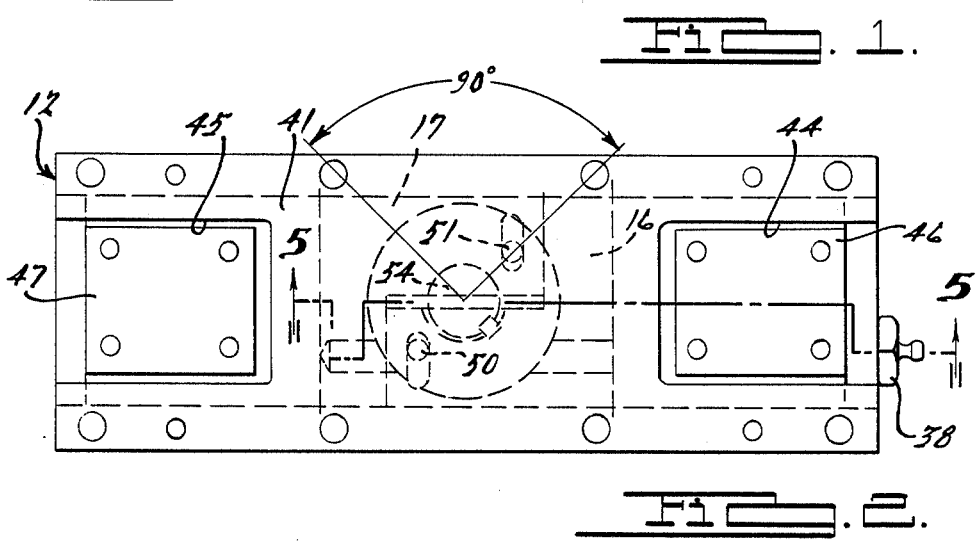
FIG. 2 is a top plan view of FIG. 1.

The cam mechanism 18 is positioned within the cavity 24 of the vertical portion 26 of the T-shaped body member 12. The cam mechanism 18 is supported by and housed in the body 12. The pins 50 and 51 of the cam mechanism 18 travel through an arc of about 90°, as shown in FIG. 2. This 90° travel of the pins 50 and 51 corresponds to approximately one inch of reciprocating linear movement of the fingers 14 and 15. Also, the slots 48 and 49 and the positioning of pins 50 and 51 may be changed to vary the distance traveled by the gripper fingers 14 and 15.

The cam mechanism 18 has a bore 52 for receiving a shaft 54 from the rotary actuator 20. The shaft 54 is secured in the bore 52 to rotate the cam mechanism 18. Thus, the cam mechanism 18 transmits rotary movement from the rotary actuator 20 into reciprocating linear movement of the yoke members 16 and 17.

The actuator 20 is driven and controlled by a pneumatic or hydraulic source 11 for rotating the cam mechanism 18. Conduits 63 and 65 connect the pneumatic source with the actuator 20. The actuator 20 is secured to the body 12 and is associated with the cam mechanism 18 by the shaft 54. Generally, the actuator 20 moves rotationally in one direction to produce a desired torque. An example of rotary actuators suitable for use in the present invention are produced by Tol-o-matic, as its 1825 series, which have a high working surface area upon which the working fluid may work as compared to other alternatives such as conventional piston type arrangements.

Figure 5:
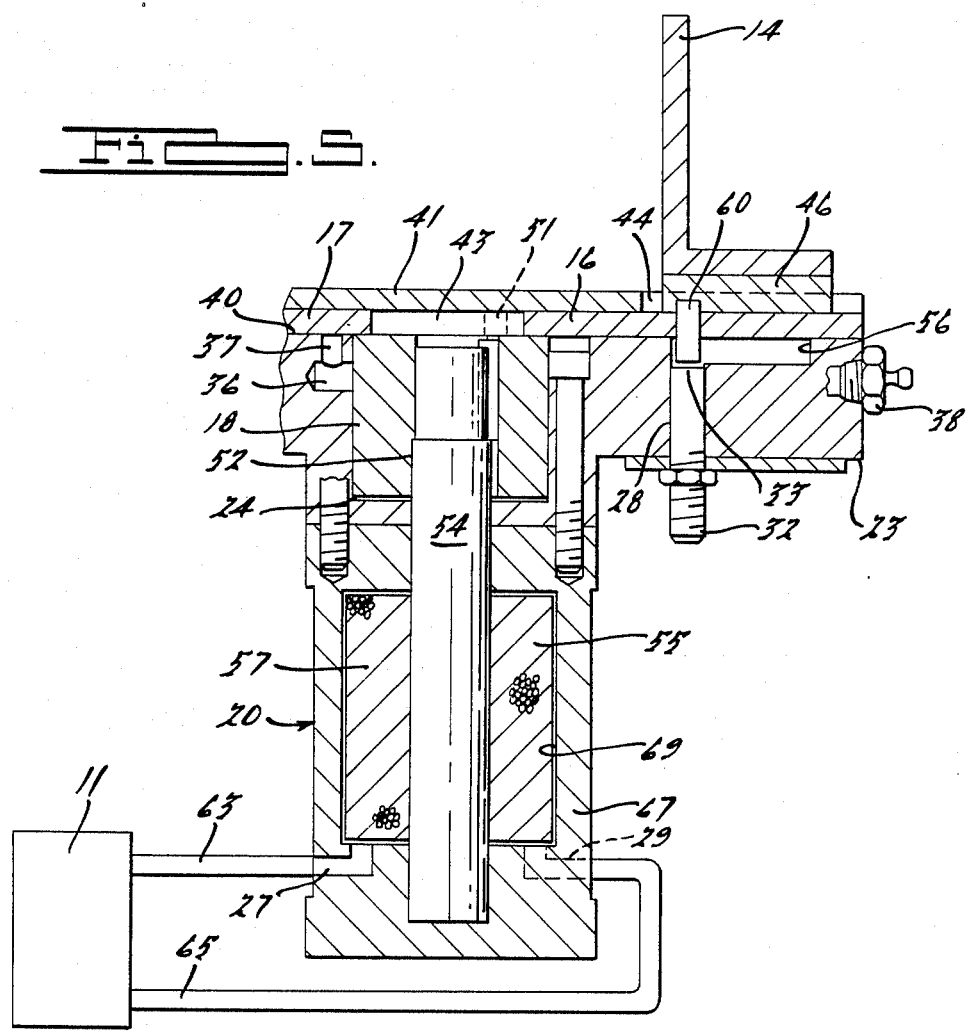
FIG. 5 is a partial cross-section view of FIG. 2 along line 5—5 thereof.

The actuator 20 is illustrated in cross section in FIG. 5. The actuator 20 includes a housing 67 having a bore 69. The shaft 54 has vanes 55 and 57 which respond to pneumatic blasts entering the housing, through bores 27 and 29, rotating the shaft 54. The vanes 55 and 57 provide the rotary actuator 20 with a larger working surface per pneumatic blast than conventional piston-type actuators. This larger working surface enables the actuator to deliver a higher torque per blast than conventional reciprocating piston driven actuators.

Proximity switches 32 and 34 are positioned in apertures 28 and 30, respectively, in the body 12. The proximity switches 32 and 34 sense the movement of the yoke members 16 and 17 which, in turn, determine the reciprocating movement of the gripper fingers 14 and 15. The proximity switches 32 and 34 may communicate with a microprocessor to enable the microprocessor to determine the next functional step of the gripper apparatus 10. The proximity switches 32 and 34 are positioned such that the ends 33 and 35 are in communication with slots 56 and 58 in the opposite sections 23 and 25 of the cross portion 22 of the body 12. The slots 56 and 58 enable elements 60 and 62, mounted on yoke members 16 and 17, to move within the slots 56 and 58 and to be sensed by the proximity switches 32 and 34. The elements 60 and 62 also provide the gripper apparatus 10 with a secondary stop mechanism. Thus, if the proximity switches 32 and 34 would fail to sense the elements 60 and 62, the elements 60 and 62 would contact the extremes of the slots 56 and 58, stopping movement of the gripper fingers 14 and 15.

Figure 7:
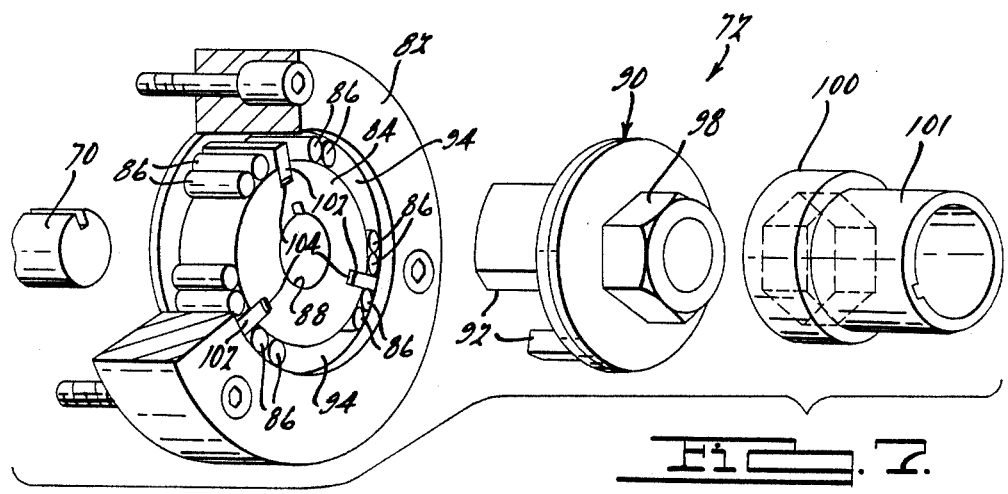
FIG. 7 is an exploded partially in cross-section perspective view of the locking mechanism of FIG. 6.

Turning to FIGS. 6 and 7, a second embodiment of the present invention is shown. Elements in the second embodiment, which are substantially the same as in the first embodiment will be designated with the same reference numeral with the reference numeral primed.

Referring to FIG. 6, a gripper apparatus is shown and designated with the reference numeral 10'. The gripper apparatus 10' includes a body 12', fingers 14' and 15', yoke members 16' and 17', a cam mechanism 18', and a rotary actuator 20'. These elements are substantially the same as those in the first embodiment and only a description of the differences with the elements of the first embodiment will be recited herein.

The cam mechanism 18' includes a shaft member 70 projecting from the cavity 24' of the body member 12'. The cam mechanism 18' is housed and secured to the body member 12' as described above in the first embodiment. The shaft 70 includes a lock mechanism 72 positioned about the shaft member 70. The lock mechanism 72 is also associated with the actuator shaft 54'.

The actuator 20' has an axis of rotation 21 which projects through its shaft 54' and the cam shaft 70. The axis of rotation 21 is perpendicular to the plane of the yoke members 16' and 17'. Also, the axis of rotation 21 is perpendicular to the straight line associated with the reciprocating movement of the yoke members 16' and 17'.

An exploded partial cross-section perspective view of the lock mechanism 72 is shown in FIG. 7. The lock mechanism 72 further includes an outer race 82 which is stationarily secured to the body 12. A cam 84 is rotatably positioned within the race 82. Rolls 86 enable the cam 84 to selectively rotate within the race 82. The cam 84 has a bore 88 there through to enable the cam shaft 70 to be secured to the lock mechanism 72. The lock mechanism 72 is designed such that the inner cam 84 is rotated as long as it is driven. However, once the drive stops, the cam 84 locks the cam shaft 70 in place.

The cam 84 is driven by a driver 90. The driver 90 has projecting legs 92 which insert into gaps 94 between rolls 86. The driver includes a hex head 98 to enable securement of a fitting 100, which is secured to a convertor collar 101 keyed to the actuator shaft 54'. The actuator shaft 54' rotates continuously with the driver 90. An annular extended housing section 91 covers the collar 101, fitting 100, driver 90 and the surrounding connecting portions of various parts.

The groups of rolls 86 form three locking areas. FIG. 7 illustrates the locking rolls 86 tightly wedged between the cam 84 and the outer race 82. The locking rolls 86 are held constantly in position by a compression spring (not shown) positioned underneath the key 102 pushing against the rolls on each side of the pin 102. The key 102 is used to support and locate the spring between the locking rolls 86 and it also acts as a torque power transfer point. A leaf spring 104 positioned between the key 102 and the cam 84 is also used in connection with keeping the key 102 in proper alignment. With the lock mechanism 72 in this condition, it is possible to move either the cam 84 or the cam shaft 70. The driver 90 rotates the shaft in one or the other direction. The projecting legs 92 are in close proximity with the locking rolls 86 once the projecting legs 92 are inserted in the gaps 94 between the locking rolls 86. The driver 90 floats on the shaft and is free to rotate slightly in either direction until the projecting legs 92 come in contact with the three sets of locking rolls 86 simultaneously. As torque is applied to the driver 90, it unwedges the locking rolls 86, compresses the spring until the roll 86 next to the key 102 actually transmits the torque forces to the key 102 and the key 102 to the cam 84. The cam 84 then rotates the cam shaft 70 to any desired position. As soon as movement of the driver 90 and shaft 70 stops, the shaft is automatically and securely locked in position.

The cam shaft member 70 is generally in a continuous locked position. The cam shaft member 70 can be locked in any position about its 360° rotation in either direction, as explained above. Locks which perform satisfactorily for the lock mechanism 72 described herein, are those manufactured by Universal Vice and Tool Company, Schwartz Fixture Division. However, any type of rotary shaft lock may be used for locking the cam shaft member 70 having the same function where driving can be implemented from outer ring of the lock and a reversal of the inner ring locks the device, or vice-versa.

A rotary lock mechanism 72 is utilized in the present invention to enable locking of the cam mechanism 18' in any position or prevent undesired reverse rotation during use of the gripper apparatus 10'. If power, air supply or hydraulic supply to to the present invention is cut off, the lock mechanism 72 locks fingers 14' and 15' of the gripper apparatus 10' in the position in which it is disposed at that time against any reverse rotation. Thus, if the gripper apparatus 10' is holding a workpiece and the gripper apparatus 10' loses power, the present invention will lock the workpiece between fingers 14' and 15', in position, until power is restored to the gripper apparatus 10'.

The proximity switches 32' and 34' may be also utilized to shut off power to the gripper apparatus 10' and lock the gripper apparatus 10' in a desired position. The proximity switches 32' and 34' may also enable an operator to determine if a power failure has occurred. If a continuously repetitive signal of the proximity switches 32' and 34' is not sensed by the microprocessor, an alarm may then be generated to the operator that power is interrupted to the gripper apparatus 10'.

While the above summarizes the present invention, it will become apparent to those skilled in the art that modifications, variations, and alterations may be made without deviating from the scope and fair meaning of the subjoined claims.

What is claimed is:

1. A gripper apparatus comprising:
   yoke means including a pair of elongated plate members each having a longitudinal axis and slot means, said elongated plate members moving in a reciprocating linear pattern in a plane in a direction along said longitudinal axis, said longitudinal axes being collinear;
   finger means supported by said plate members and moving in a reciprocating linear pattern for grasping and releasing a workpiece;
   cam means coupled with said slot means of both said plate members for driving said plate members in said reciprocating linear pattern; and
   rotary actuator means associated with said cam means for rotatably driving said cam means, said rotary actuator means having an axis of rotation substantially perpendicular to said longitudinal axes wherein said rotary actuator means rotates said cam means which, in turn, transmits rotary movement of said rotary actuator means into reciprocating linear movement of said plate members driving said finger means for grasping and releasing a workpiece.

2. The gripper apparatus according to claim 1 wherein said cam means includes pins coupled with said slot means such that said pins and slot means may be changed to vary the distance travelled by said finger means.

3. A gripper apparatus comprising:
   a pair of finger members opposing one another and having a reciprocating stroke along a linear path away from and towards one another for grasping and releasing a workpiece;
   yoke means including at least one member associated with said finger members, said yoke means moving in a reciprocating linear pattern in a plane for providing said finger members with a reciprocating linear stroke;
   cam means associated with said yoke member for driving said yoke member in said reciprocating linear pattern;
   rotary actuator means associated with said cam means for rotatably driving said cam means wherein said rotary actuator means rotates said cam means to transmit rotary movement of said actuator means into said reciprocating linear stroke of said finger members; and
   means coupled with said cam means and said actuator means for enabling locking of said cam means to stop said finger members at any position along the stroke of said finger members as desired.

4. The gripper apparatus according to claim 3, wherein said rotary actuator means includes an axis of rotation and said rotary actuator means is positioned such that said actuator axis of rotation is perpendicular to a line of travel along the plane associated with the reciprocating linear pattern of said yoke members.

5. A gripper apparatus comprising:
   a body member;
   a pair of finger members associated with said body member for moving in a reciprocating linear stroke away from and toward one another grasping and releasing a workpiece;
   yoke means supported by said body member and associated with said finger members, said yoke means reciprocating in a linear pattern in a channel on said body for providing said finger members with said reciprocating linear stroke with respect to one another;
   cam means associated with said yoke means for driving said yoke means in said reciprocating linear pattern;
   rotary actuator means associated with said cam means for rotatably driving said cam means wherein said rotary actuator means rotates said cam means to transmit rotary movement of said actuator means into said reciprocating linear stroke of said finger members;

means coupled with said cam means and said actuator means for enabling locking of said cam means for stopping said finger members at any position along the stroke of said finger members; and proximity switch means mounted on said body member for sensing the disposition of said finger members.

6. The gripper apparatus according to claim 5 wherein said rotary actuator means includes an axis of rotation and said rotary actuator means is positioned such that said actuator axis of rotation is perpendicular to a line of travel associated with the reciprocating linear pattern of said yoke means.

7. A gripper apparatus comprising:
a pair of finger members opposing one another and having a reciprocating stroke along a linear path away from and towards one another for grasping and releasing a workpiece;
yoke means including a pair of members supported by said body member and associated with said finger members, said yoke members each having an axis and slot means, said axes being collinear, said yoke members reciprocating in a linear pattern in a plane along said axes for providing said finger members with said reciprocating linear stroke with respect to one another;
cam means coupled with said slot means of said pair of members for driving said pair of members in said reciprocating linear pattern;
rotary actuator means associated with said cam means for rotatably driving said cam means, said rotary actuator means having an axis of rotation substantially perpendicular to said longitudinal axes, and said rotary actuator means including an actuating member having a longitudinal working surface responsive to pressurized fluid entering said actuator means to rotate said cam means and transmit rotary movement of said actuator means into said reciprocating linear stroke of said finger members.

8. The gripper apparatus in accordance with claim 7 wherein said actuator means further includes a bore and a shaft coupled with said longitudinal working surface positioned in said bore, wherein said shaft is coupled with said cam means to rotatably drive said cam means.

9. A gripper apparatus comprising:
a pair of finger members opposing one another and having a reciprocating stroke along a linear path away from and towards one another for grasping and releasing a workpiece;
cam means associated with said pair of finger members for driving said finger members in said reciprocating linear stroke;
rotary actuator means associated with said cam means for rotatably driving said cam means, said rotary actuator means including an actuator member to rotate said cam means to transmit rotary movement of said actuator means into said reciprocating linear stroke of said finger members; and
lock means associated with said cam means and said actuator means, said lock means having an outer race stationarily secured to a body member and an inner cam member associated with said cam means for enabling locking of said cam means for stopping said finger members at any position along the stroke of said finger members.

10. The gripper apparatus in accordance with claim 9 wherein said lock means further includes a driver means associated with both said rotary actuator means and said inner cam member and said outer race for driving said inner cam member.

11. A gripper apparatus comprising:
finger means moving in a reciprocating pattern for grasping and releasing a workpiece;
transfer means including a pair of members, said members each including an axis and slot means, said axes being collinear, said members moving in a reciprocating linear pattern along said axes for driving said finger means in said reciprocating pattern; and
rotary actuator means coupled with said slot means of said pair of transfer members for driving said transfer means which, in turn, transmits rotary movement of said rotary actuator means into reciprocating movement of said finger means for grasping and releasing a workpiece and said rotary actuator means having an axis of rotation substantially perpendicular to said axes.

12. The gripper apparatus according to claim 11 wherein proximity switch means is associated with said apparatus for sensing the disposition of said finger means.

13. A gripper apparatus comprising:
finger means moving in a reciprocating pattern for grasping and releasing a workpiece;
transfer means including a pair of members moving in a reciprocating pattern for driving said finger means in said reciprocating pattern;
rotary actuator means associated with said pair of transfer members for driving said transfer means which, in turn, transmits rotary movement of said rotary actuator means into reciprocating movement of said finger means; and
means coupled with said transfer means and said actuator means for locking said transfer means to stop said finger means at any position along the stroke of said finger means as desired.

14. The gripper apparatus according to claim 13 wherein proximity switch means is associated with said apparatus for sensing the disposition of said finger means.

* * * * *